United States Patent
Stiglitz

[15] 3,649,318
[45] Mar. 14, 1972

[54] METHOD OF PREPARING CONCRETES OF STABLE ALUMINOUS CEMENTS

[72] Inventor: Paul Stiglitz, La Violette, France
[73] Assignee: Societe Anonyme: Ciments Lafarge, Paris, France
[22] Filed: July 24, 1968
[21] Appl. No.: 747,192

[30] Foreign Application Priority Data

July 31, 1967 France......................166375

[52] U.S. Cl................................................106/104
[51] Int. Cl..................................................C04b 7/32
[58] Field of Search..........................106/104, 89

[56] References Cited

UNITED STATES PATENTS 1,913,943    6/1933    Morgan........................106/104

*Primary Examiner*—James E. Poer
*Assistant Examiner*—W. T. Scott
*Attorney*—Brumbaugh, Graves, Donohue & Raymond

[57] ABSTRACT

A method for preparing stable concrete from aluminous cements is disclosed. This is accomplished by controlling the water/cement ratio between 0.25 and 0.4 when the cement is mixed with water. This ratio insures use of the water for hydration of the binding paste into cubic aluminate.

3 Claims, 1 Drawing Figure

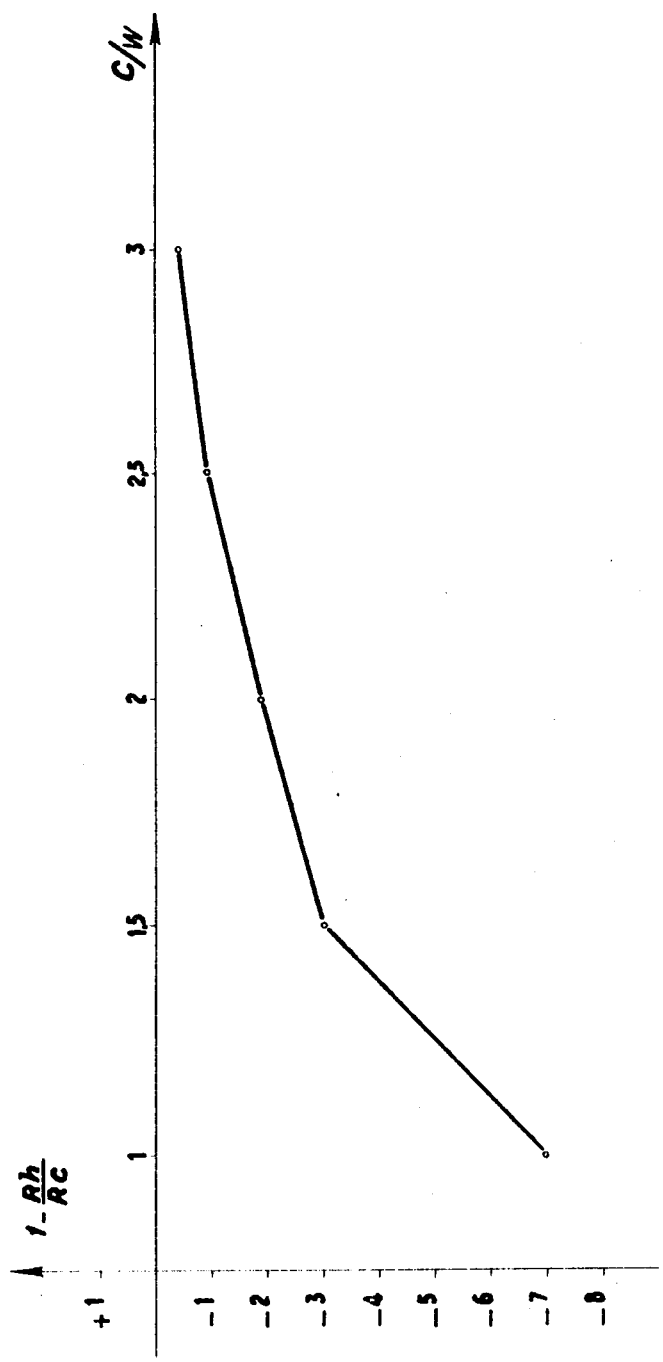

METHOD OF PREPARING CONCRETES OF STABLE ALUMINOUS CEMENTS

My invention relates to a method of preparing stable aluminous cements, and further concretes and mortars from said aluminous cements.

It is known that anhydrous aluminous cements consist, for the most part, of calcium aluminates. The other ingredients, silicates, silico-aluminates and calcium ferrites, which are due to impurities in the raw materials, are considered as having little or no hydraulic effect at ordinary temperatures.

The hydration products of these cements, causing the setting and hardening of the latter are therefore almost exclusively hydrated calcium aluminates belonging to the CaO — $Al_2O_3$ — $H_2O$ system.

This system, which has been extensively studied, can be represented graphically by a collection of curves, defining, for a given temperature, the areas in which hydrated aluminates occur, in relation with the compositions of the solutions, whether stable or metastable, in equilibrium with the solid precipitated phases. The curves themselves represent the compositions of the saturated solutions of hydrates or hydroxides of the system, in water or in lime solutions of various concentrations.

There are six solid phases, i.e., three hydrates: monocalcium hydrated aluminates ($CaO \cdot Al_2O_3 \cdot 7$–$10\ H_2O$), dicalcium hydrated aluminate ($2CaO \cdot Al_2O_3 \cdot 8H_2O$), tetracalcium hydrated aluminate ($4CaO \cdot Al_2O_3 \cdot 13H_2O$); and three hydroxides: tricalcium cubic aluminate ($Ca_3[Al(OH)_6]_2$) calcium hydroxide $Ca(OH)_2$ and aluminum hydroxide $Al(OH)_3$.

The only stable phases of the system are the hydroxides ($Ca(OH)_2$, $Al(OH)_3$ and $Ca_3[Al(OH)_6]_2$. All the hexagonal or pseudo hexagonal aluminate hydrates are metastable with respect to these three phases, due to the fact that they can redissolve in an excess of water to give a supersaturated solution of a stable phase which, at that point precipitates. Their conversion is therefore unavoidable, although very slow under normal conditions of use of aluminous cements, and leads, for the latter, to $Ca_3[Al(OH)_6]_2$ and $Al(OH)_3$, i.e., to the stable phases of that part of the diagram which is poor in lime.

This conversion, so-called evolution of aluminous cements, is highly accelerated in the case when the temperature is increased above 30° C., which also enhances the conversion of the alumina formed in the first stages of the hydration into stable gibbsite.

At a normal temperature, the first hydration product formed after mixing of the aluminous binder is monocalcium aluminate $CaO \cdot Al_2O_3 \cdot 7$–$10H_2O$. Due to the fact that, as previously mentioned, the latter aluminate is metastable with respect to cubic aluminate and gibbsite, its evolution is noted, which is usually coupled with a loss in mechanical strength.

Tests carried out by applicant have led to confirmation of the theory according to which conversion leads to the formation of a large quantity of free water which, due to the fact that it remains in the binding paste, decreases the strength of the latter. Indeed, the conversion can be written: $3CaO \cdot Al_2O_3 \cdot 7$–$10H_2O \rightarrow Ca_3[Al(OH)_6]_2 + 4Al(OH)_3 + 18H_2O$.

This release of water is further accompanied by an increase in porosity: actually, the volume of three molecules of $CaO \cdot Al_2O_3 \cdot 10H_2O$, while the sum of the volumes of one molecule of $Ca_3[Al(OH)_6]_2$ and four molecules of $Al(OH)_3$ is only 278.3 cm.³, i.e., a decrease in solids volume of over 50 percent.

Now, according to FERET, the strength of a hardened cement paste, at a $t$ stage, is given by the formula:

$$R_t = K_t \frac{c^2}{(c+d+a)^2}$$

where:

$K$ is a constant dependent on the binder employed, on the storage characteristics and the stage $t$
$c$ is the absolute volume of the anhydrous cement
$d$ is the absolute volume of water
$a$ is the absolute volume of air.
} at time of mixing According to Dzulynski, the hydrated product concentration is the crucial factor, the latter being given by the formula:

$$\gamma = \frac{Ch}{Ch + d_1 + v}$$

where:

$\gamma$ is the hydrated product concentration
$Ch$ stands for the hydrated product
$d_1$ is the free water
$v$ stands for the empty spaces (air) the proportions being in volume expressed in the unit of volume of the mortar paste.

Compressive strength $R$ is expressed as a function of $\gamma$, by the exponential formula:

$$R = R_0 e^{k\gamma}$$

where:

$R$ and $R_0$ are coefficients having a specific value for a given binder, independently from the influence of working characteristics, storage and age.

According to these formulas, it can be seen that a given volume of air has an effect similar to that of the corresponding volume of water. The porosity appearing at the time of hexagonal aluminate-cubic aluminate conversion is therefore always harmful to mechanical strength, whatever the degree of humidity in the mortar paste or concrete may be. Moreover, if water is present, it favors, as mentioned previously, the redissolution of the hexagonal aluminate and the precipitation of the cubic aluminate, i.e., the continuation of conversion up to completion.

On the other hand, the hydration reaction is quite vigorous; the heat of hydration is given up in a very short time and in order to avoid overheating of the concrete, it is necessary, on a building yard, to strip as soon as possible and spray the concrete for at least 24 hours so as to maintain the temperature below 30° C., which is a constraint for the users.

In order to avoid these various drawbacks and constraints applicant's idea was to prepare concretes and mortars from aluminous cements under such conditions that hydration of the binding paste would occur directly into cubic aluminate. To this effect, in order to obtain these concretes and mortars from aluminous cements in accordance with the invention a water/cement ration was used such that the entire mixing water was employed for the hydration of the binder into cubic aluminate. This water/cement ratio advantageously ranges from 0.25 to 0.4. All values for water/cement ratios described herein are on a by-weight basis.

When using concretes and mortars prepared according to the invention, stripping may be carried out at any time after hardening has actually taken place, and in particular, it is not necessary to cool the concrete mass.

Tests carried out on concretes and mortars obtained according to the invention have shown, under these conditions, that only slightly lower mechanical strengths are obtained as compared with those obtained at normal temperatures which, instead of decreasing with time, show, on the contrary a slight increase. These results are summarized in the following table.

| Working temperature | Compound obtained | W/C ratio | Compressive strength (in bars) | | | |
|---|---|---|---|---|---|---|
| | | | 6h. | 24h | 7d | 28d |
| 25° C. | $CaO \cdot Al_2O_3 \cdot 10H_2O$ | 0.5 | 250 | 430 | 550 | 575 |
| 80° C. | $Ca_3[Al(OH)_6]_2$ + $Al(OH)_3$ | 0.4 | 270 | 300 | 400 | — |
| | | 0.33 | 350 | 450 | — | 530 |

While running these tests, the value of ($1 - Rh/Rc$) was studied as a function of the water/cement ratio, where: $Rh$ is the strength of a concrete containing exclusively hexagonal aluminates, and $Rc$ is the strength of this same concrete comprising only cubic aluminate. The appended curve shows that, when this water/cement ratio decreases (or when the cement/water ratio increases), the value of 1−Rh/Rc tends towards zero, i.e., Rc tends to equal Rh.

The curve shows that equivalency is not reached for the usually recommended water/cement ratio of 0.4 (this equivalency is reached for W/C = 0.3), but this small relative difference is quite acceptable when the high value of the strength of hexagonal aluminate is considered, this value being measured in the laboratory under working conditions which make it possible to obtain this latter aluminate alone, while on the building yard, it is often very difficult to prevent its entire or partial conversion. In principle, the strength obtained with cubic aluminate revolves around 400 bars for such a water/cement ratio and, more important, continues to increase instead of decreasing quite extensively as in the case of hexagonal aluminate conversion. The very harsh conditions resulting from an 80° C. temperature under which these values were obtained must be taken into account.

For relatively low-water/cement ratios, the setting into place (or casting) may be difficult, and it may be advantageous to use known means which facilitate it, for example, the addition of a plasticizer, vibration, pervibration or others.

I claim:

1. A method of obtaining concretes and mortars from stable aluminous cements comprising adding an amount of water to said cements so that the water/cement ratio by weight is about 0.25 to about 0.4 and thereby insures that the entire mixing water is used for the hydration of the binder into cubic aluminate.

2. A method as claimed in claim 1 in which the water/cement ratio by weight is about 0.33.

3. The product obtained according to the method claimed in claim 1.

* * * * *

PO-1050
(5/69)

UNITED STATES PATENT OFFICE
CERTIFICATE OF CORRECTION

Patent No. 3,649,318            Dated March 14, 1972

Inventor(s) Paul Stiglitz

It is certified that error appears in the above-identified patent and that said Letters Patent are hereby corrected as shown below:

Column 1, line 61, after "10 $H_2O$" insert --is 569.6 $cm^3$--;

Column 2, line 16, "$R = R_o e^k \gamma$" should be --$R = R_o e^{k\gamma}$--;

Column 2, line 45, "ration" should read --ratio--;

Column 2, line 67, "$Ca_3[Al(OH)_6 2$" should be --$Ca_3[Al(OH)_6]_2$--;

Column 4, line 1, "low-water" should be --low water--.

Signed and sealed this 5th day of September 1972.

(SEAL)
Attest:

EDWARD M.FLETCHER,JR.            ROBERT GOTTSCHALK
Attesting Officer                      Commissioner of Patents